United States Patent
Termer et al.

(10) Patent No.: US 10,893,675 B2
(45) Date of Patent: Jan. 19, 2021

(54) POWDER FORMULATION CONTAINING INSECT REPELLENT

(71) Applicant: MERCK PATENT GMBH, Darmstadt (DE)

(72) Inventors: Michael Termer, Hofheim (DE); Frank Pfluecker, Darmstadt (DE); Lilia Heider, Gernsheim (DE); Alexandra Axt-Heidemann, Alsbach-Haehnlein (DE); Jutta Zur Lage, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 113 days.

(21) Appl. No.: 15/548,020

(22) PCT Filed: Jan. 8, 2016

(86) PCT No.: PCT/EP2016/000026
§ 371 (c)(1),
(2) Date: Aug. 1, 2017

(87) PCT Pub. No.: WO2016/124306
PCT Pub. Date: Aug. 11, 2016

(65) Prior Publication Data
US 2018/0020661 A1 Jan. 25, 2018

(30) Foreign Application Priority Data
Feb. 2, 2015 (EP) .................................. 15000302

(51) Int. Cl.
| A01N 37/46 | (2006.01) |
| A01N 47/16 | (2006.01) |
| A01N 37/18 | (2006.01) |
| A01N 65/26 | (2009.01) |
| A01N 65/44 | (2009.01) |
| A01N 25/12 | (2006.01) |

(52) U.S. Cl.
CPC ............ *A01N 37/46* (2013.01); *A01N 25/12* (2013.01); *A01N 37/18* (2013.01); *A01N 47/16* (2013.01); *A01N 65/26* (2013.01); *A01N 65/44* (2013.01); *Y02A 50/30* (2018.01)

(58) Field of Classification Search
CPC ........ A01N 25/12; A01N 25/08; A01N 37/18; A01N 37/46; A01N 47/16; A01N 65/26; A01N 65/44; Y02A 50/34; Y02A 50/30
USPC ........................................................ 514/551
See application file for complete search history.

(56) References Cited

U.S. PATENT DOCUMENTS

| 1,375,220 | A | 4/1921 | Leist |
| 1,533,164 | A | 4/1925 | Collias |
| 1,755,178 | A | 4/1930 | Grant |
| 2,408,389 | A | 10/1946 | Gertler |
| 3,800,034 | A | 3/1974 | Kircher |
| 4,756,905 | A | 7/1988 | Melnik |
| 5,550,115 | A | 8/1996 | Garst |
| 7,790,002 | B2 | 9/2010 | Penrose |
| 7,790,202 | B1* | 9/2010 | Martell ................. A61Q 15/00 424/642 |
| 7,922,991 | B2 | 4/2011 | Mitsuhashi et al. |
| 7,960,437 | B2 | 6/2011 | Anderson et al. |
| 8,545,904 | B1 | 10/2013 | Morse et al. |
| 2004/0220137 | A1 | 11/2004 | Sauermann |
| 2012/0301520 | A1* | 11/2012 | Dohmen ................ A61K 47/02 424/400 |
| 2014/0294968 | A1 | 10/2014 | Hofmann et al. |

FOREIGN PATENT DOCUMENTS

| CN | 1986105233 A | 4/1987 |
| DE | 10133202 A1 | 1/2003 |
| EP | 0492007 * | 7/1992 |
| EP | 487404 B1 | 10/1995 |
| EP | 1475351 A1 | 11/2004 |
| JP | 2003516950 A | 5/2003 |
| JP | 2004161600 A | 6/2004 |
| JP | 2007063185 A | 3/2007 |
| JP | 2014523446 A | 9/2014 |
| WO | 1995017091 A1 | 6/1995 |
| WO | 1995028410 A1 | 10/1995 |
| WO | 2016124306 A1 | 8/2016 |

OTHER PUBLICATIONS

International Search Report PCT/EP2016/000026 dated Feb. 23, 2016.
Database WPI Week 200725, Derwent Publications Ltd., London, GB; AN 2007-247798, XP002754217.
Mitchell L Schlossman et al: "The Evaluation of Chemical Binders and Their Effect on Pressed Powders", vol. 24, May 23, 1973 (May 23, 1973), pp. 357-362, XP002742809, ISSN: 0037-9832, Retrieved from the Internet.
Database WPI Week 198451, Derwent Publications Ltd., London, GB; AN 1984-316290, XP002754204.

(Continued)

*Primary Examiner* — Sabiha N Qazi
(74) *Attorney, Agent, or Firm* — Millen White Zelano and Branigan, PC; Csaba Henter (57) ABSTRACT

The present invention relates to a powder formulation comprising at least one insect repellent and magnesium hydroxide carbonate, and to a process for the preparation of the formulation and to the use of the formulation for repelling insects.

16 Claims, 1 Drawing Sheet

(56) References Cited

OTHER PUBLICATIONS

English machine translation of WO2016124306A1 published Aug. 11, 2016 to Termer Michael of Merck Patent GMBH.
English machine translation of JP2007063185A published Mar. 15, 2007 to Ichimura Yumiko of Dainippon Jochugiku KK.
English machine translation of CN1986105233A published Apr. 22, 1987 to Wang Xue-ming.
C. A. Rice-Evans, N. J. Miller, G. Paganga, Trends in Plant Science 1997, 2 (4), 152-159.
K. Lemanska, H. Szymusiak, B. Tyrakowska, R. Zielinski, A. E. M. F. Soffers, I. M. C. M. Rietjens; Free Radical Biology&Medicine 2001, 31 (7), 869-881.
Lemanska, H. Szymusiak, B. Tyrakowska, R. Zielinski, I. M. C. M. Rietjens; Current Topics in Biophysics 2000, 24 (2), 101-108.
Schlossman, M. et al., "Treated Pigments, New Ways to Impart Color on the Skin," Cosmetics & Toiletries, vol. 105, pp. 53-64 (1990).
Office Action dated Nov. 19, 2019 in corresponding JP 2017-540827 (pp. 1-10).

* cited by examiner

POWDER FORMULATION CONTAINING INSECT REPELLENT

The present invention relates to a powder formulation comprising at least one insect repellent and magnesium hydroxide carbonate, and to process the preparation of the formulation and to the use of the formulation for repelling insects.

Insects represent a nuisance or even a threat to humans and also to animals in a number of respects. A multiplicity of mosquitoes, horseflies, fleas, lice, bugs, as well as ticks, mites, wasps, bees, ants, cockroaches and flies summarised below under the collective terms insects and spiders—or for simplification even under the generic term insects, which is used incorrectly in the biological sense. Mosquitoes, horseflies, fleas, lice, bugs, as well as ticks and mites feed on the blood of warm-blooded animals, which also include humans and mammals. They bore their way into the skin of their victims with their piercing and sucking tools until they hit blood vessels. During feeding, they secrete vessel-dilating and anticoagulant agents which can result in itching, hive formation and allergic reactions in the host. In particular in the tropics and subtropics, there is in addition a risk of infection with pathogens. Thus, for example, malaria is transmitted by the *Anopheles* mosquito or yellow fever is transmitted by the yellow fever mosquito. In temperate regions too, there is a risk of infections with pathogens transmitted by insects, such as, for example, tick-borne encephalitis transmitted by tick bite.

Protection against annoyance by insects and spiders is offered by so-called insect repellents. These are taken to mean a number of active substances which have a repellent effect on insects and spiders due to their odour. They are generally low-volatility compounds which evaporate slowly on the skin and thus form a scent pall above the skin which drives away the insects.

The requirements of an insect repellent are high and multifarious. In particular, effective protection of the skin against insects must be ensured. A long-lasting repulsion action over several hours, even under climatically unfavourable conditions, is important. Furthermore, the repellent should have the broadest possible action spectrum. Further requirements are maximum skin and mucous membrane toleration without toxic, allergic or sensitising properties, but where skin penetration should not occur. Furthermore, the substance should have high chemical stability, i.e. should have no hydrolysability, no photooxidisability, no oxidisability, high thermal stability and high sweat resistance.

The commonest insect repellents include N, N-diethyl-3-methylbenzamide (or N,N-diethyl-m-toluamide) ("DEET"), which is active against mosquitoes, stable and sand flies, horseflies, fleas, bugs, ticks and mites. A likewise known insect repellent is 1-(1-methylpropoxycarbonyl)-2-(2-hydroxyethyl)piperidine (icaridin). The natural insect repellents include, for example, citronella oil or andiroba oil. Ethyl 3-(N-n-butyl-N-acetylamino)propionate (available from Merck KGaA, Darmstadt, Germany, under the trade name IR3535®), which can be employed, for example, against mosquitoes, tsetse flies, lice, sand flies, cockroaches, ants, ticks and horseflies, is particularly effective.

These substances are used in a number of commercial products today. These are mostly emulsions, aerosols, gels or sprays In order to be able to achieve good efficacy, the concentration of the insect repellents in the formulation is generally between 5 and 50% by weight. Since the said insect repellents are liquids (oils), high concentrations of greater than 10% can easily be incorporated into emulsions, gels or sprays.

WO 98/19538 describes, for example, stable aqueous formulations of ethyl 3-(N-butylacetamino)propionate.

By contrast, however, the use of insect repellents in high concentrations in classical powder formulations (comprising exclusively talc in combination with silica, PMMA, starch, magnesium stearate or mica) is not possible. The reason for this is that the particles of the powder stick to one another and thus make distribution on the skin much more difficult. In addition, it is not guaranteed that a formulation of this type has good efficacy.

WO 95/28410 describes generally powder formulations comprising biologically active material (inter alia, insect repellents are mentioned), and an alkylpolyglycoside and a carrier material, such as silica, talc, a zeolite, magnesium aluminium silicate, calcium sulfate, magnesium carbonate, magnesium oxide or aluminium oxide.

CN 86105233 A describes an insect-repellent powder comprising calamine, calcium carbonate, magnesium carbonate, zinc stearate, talc, camphor, borneol, peppermint oil, thymol, perfumes and p-menthane-3,8-diol.

U.S. Pat. No. 7,790,202 B1 discloses a skin formulation in powder form which can be employed, inter alia, for repelling insects, comprising maize starch, zinc oxide, peppermint powder, basil powder, rosemary powder and *eucalyptus* powder, as well as copper mica and silica.

JP 2007-063185 A discloses an alcohol-free insect-repellent powder comprising an insect repellent, an inorganic powder selected from talc, kaolin and bentonite, and a silicic acid compound.

The prior art has to date not disclosed any powder formulations for the commonest insect repellents.

The object of the present invention was therefore the provision of a powder formulation comprising at least one insect repellent selected from N,N-diethyl-m-toluamide, ethyl 3-(N-butylacetamino)propionate, 1-(1-methylpropoxycarbonyl)-2-(2-hydroxyethyl)piperidine, citronella oil and andiroba oil.

Surprisingly, it has been found that these insect repellents can be formulated in powder formulations if these comprise magnesium hydroxide carbonate.

The present invention therefore relates firstly to a powder formulation comprising (a) at least one insect repellent selected from N,N-diethyl-m-toluamide, ethyl 3-(N-butylacetamino)propionate, 1-(1-methylpropoxycarbonyl)-2-(2-hydroxyethyl)piperidine, citronella oil and andiroba oil and (b) magnesium hydroxide carbonate.

1-(1-Methylpropoxycarbonyl)-2-(2-hydroxyethyl)piperidine is known as an insect repellent and is commercially available, for example, under the name Bayrepel® from Lanxess AG (INCI: Icaridin or Picaridin; IUPAC: 1-piperidinecarboxylic acid 2-(2-hydroxyethyl)-1-methylpropyl ester; CAS 119515-38-7).

Ethyl 3-(N-butylacetamino)propionate (synonymous with ethyl 3-(acetylbutylamino)propionate) (CAS 52304-36-6) is a known insect repellent which is marketed by Merck KgaA, Darmstadt, under the trade name IR3535®. This substance with its excellent properties with respect to skin and mucous membrane tolerability without toxic, allergic or sensitising properties is employed in, inter alia, cosmetic preparations in order to protect humans or animals directly against attacks by, for example, mosquitoes or flies.

N,N-diethyl-m-toluamide (synonymous with diethyltoluamide, N,N-diethyl-3-methylbenzamide) (CAS 134-62-

3) is also known under the abbreviation DEET and has a broad action spectrum against various insects.

The insect repellents are preferably employed in combination. This can be, for example, a combination of ethyl 3-(N-butylacetamino)propionate with N,N-diethyl-m-toluamide, a combination of ethyl 3-(N-butylacetamino)propionate with 1-(1-methylpropoxycarbonyl)-2-(2-hydroxyethyl)piperidine or a combination of ethyl 3-(N-butylacetamino)propionate with N,N-diethyl-m-toluamide and 1-(1-methylpropoxycarbonyl)-2-(2-hydroxyethyl)piperidine. Further examples are combinations of ethyl 3-(N-butylacetamino)propionate with citronella oil and/or with andiroba oil.

In a particularly preferred embodiment, the at least one insect repellent in the powder formulation is ethyl 3-(N-butylacetamino)propionate.

Magnesium hydroxide carbonate is also known as magnesium hydrogencarbonate, basic magnesium carbonate or magnesium carbonate hydroxide. It can be described by the general empirical formula $$m MgCO_3 \cdot Mg(OH)_2 \cdot n H_2O$$

where m=3-5 and n=3-8. It is typically $$4MgCO_3 \cdot Mg(OH)_2 \cdot 4\text{-}5H_2O.$$

Basic magnesium carbonate or magnesium hydroxide carbonate, having the chemical composition: $4MgCO_3 \cdot Mg(OH)_2 \cdot 5H_2O$ can be prepared from magnesium carbonate ($MgCO_3$). Magnesium carbonate is a white powder which is very sparingly soluble in water. It forms from aqueous solution only if the latter contains a large excess of carbonic acid. Magnesium carbonate can crystallise with 5, 3 and 1 mol of water of crystallisation and is decomposed gradually to basic magnesium carbonate on boiling with water. Corresponding preparation processes have been known for some time. Magnesium hydroxide carbonate is usually obtained by precipitation from a magnesium sulfate solution using soda. Corresponding products are commercially available, for example, from Lehmann & Voss & Co.: "PharMagnesia® MC Type E", from Kremer-Pigmente: "magnesium hydroxide carbonate", from Magnesia GmbH: "Magnesia 11", "Magnesia 12", "Magnesia 10" or from Merck KGaA: "magnesium hydroxide carbonate light".

It has proven advantageous in accordance with the invention if the magnesium hydroxide carbonate employed in the powder formulation has a bulk density of at most about 200 g/l, preferably at most about 150 g/l. A bulk density of less than 130 g/l is particularly preferred.

The bulk density (also called "bulk weight") is taken to mean the density (i.e. the weight per unit volume) of a particulate solid in a fluid, in this case air. In accordance with the invention, the bulk density is determined in accordance with ISO 3923/2 with the aid of a Scott volumeter: for this purpose, the sample is, in accordance with the prescribed procedure, introduced into a cylindrical container having a capacity of $25\pm0.05$ cm$^3$ and an internal diameter of $30\pm1$ mm through the Scott volumeter via a number of baffle plates with the aid of the funnel and weighed. The average of 3 samples is determined and quoted in g/cm$^3$, g/ml or g/l.

In accordance with the invention, for example, "PharMagnesia® MC Type E", marketed by Lehmann & Voss & Co. (Article Number 24202010-00), having a bulk density of about 120 g/l, is highly suitable for use in the powder formulation according to the invention. Also suitable are magnesium hydroxide carbonate marketed by Kremer-Pigmente (Article Number 64135), having a bulk density of about 100 g/l, Magnesia 11 marketed by Magnesia GmbH (Article Number 1110000), having a bulk density of about 100-150 g/l, Magnesia 10 (Article Number 1100000) having a bulk density of 80-100 g/l, Magnesia 12 (Article Number 1120000) having a bulk density of 65-85 g/l or magnesium hydroxide carbonate marketed by Merck KGaA (Article Number 105828) having a bulk density of about 110 g/l.

In a preferred embodiment of the present invention, the powder formulation comprises 5 to 40% by weight of the at least one insect repellent, based on the total weight of the formulation. The formulation particularly preferably comprises 10 to 20% by weight of the at least one insect repellent, based on the total weight of the formulation.

In a further preferred embodiment, the powder formulation, as defined above, comprises 5 to 40% by weight of magnesium hydroxide carbonate, based on the total weight of the formulation, particularly preferably 5 to 30% by weight.

The preparations according to the invention are distinguished by the fact that they have high efficacy against insects and nevertheless have a pulverulent consistency. Surprisingly, the use of magnesium hydroxide carbonate enables adhesion of the particles to be prevented, so that incorporation of large amounts of insect repellent of up to 40% is facilitated without the formulation becoming oily or sticking. This gives rise to long-lasting protection against mosquitoes, horseflies, fleas, lice, bugs, as well as ticks, mites, wasps, bees, ants, cockroaches or flies. The formulations are furthermore distinguished by excellent cosmetic properties, are free-flowing and can be applied to the skin or hair using, for example, a brush or with the hand.

In a preferred embodiment of the present invention, the weight ratio of magnesium hydroxide carbonate to insect repellent in the formulation is 2:1 to 1:2 The ratio is preferably 1.5:1 to 1:1.

If the magnesium hydroxide carbonate content is too high, there is a possibility of the insect repellent being adsorbed too strongly on the magnesium hydroxide particles and liberation thereof no longer being possible. This causes the efficacy of the formulation to drop. Since the said insect repellents are liquids (oils), the powdery consistency of the formulation can, by contrast, drop in the case of an excessively high content of insect repellent.

The preparations are generally preparations which can be applied topically, for example a cosmetic, pharmaceutical or dermatological formulation or a medicinal product, a biocidal formulation, a pesticide, a biopesticide or an insecticide. It may also be a quasi-drug formulation or an over-the-counter (OTC) medicament. In this case, the preparations comprise a vehicle which is suitable topically cosmetically or dermatologically and, depending on the desired property profile, optionally further suitable ingredients. Besides topical use, further applications are also possible. For example, the preparation can be a formulation to be employed in the household.

For the purposes of the present invention, the term composition or formulation is used synonymously alongside the term preparation.

The preparations may include or comprise, essentially consist of or consist of the said requisite or optional constituents. All compounds or components which can be used in the preparations are either known and commercially available or can be synthesised by known processes.

For the purposes of the invention, can be used topically means that the preparation is applied externally and locally, i.e. that the preparation must be suitable for being applied, for example, to the skin or hair. The preparation according to the invention can be applied, for example, to the face, the body, the feet or the hair.

The powder formulations according to the invention are suitable for use in humans or animals. Use in humans is preferred.

The powder formulation according to the invention can be, for example, a face powder, a body powder, a baby powder or a foot powder. Depending on the application, the powder formulations may therefore have various properties, such as hiding power and adhesion capacity, sorptive capacity, adsorption capacity or antimicrobial action.

These properties can be achieved by the use of certain powder constituents. Thus, for example, silicon dioxide, magnesium carbonate, kaolin, chalk or starch can be employed in order to prepare powders which can either absorb water and hydrophilic substances or alternatively oils, fats or lipophilic substances. Titanium dioxide, zinc oxide and chalk are used in order to increase the hiding power and the adhesion capacity of a powder. The adhesion capacity can furthermore be improved by starch, aluminium oxide, zinc undecanate or also metal soaps. Furthermore, the lubricity of the powder can be increased by the use of zinc, magnesium and/or aluminium salts of lauric, myristic and/or stearic acid and by zinc decanate and/or magnesium decanate or talc.

Besides the hiding and sorptive properties, the tactile properties are furthermore of major importance for the acceptance of a powder. Accordingly, the particle size of the solids used also plays a crucial role, since excessively large pigments cause a "braking feeling" and make the skin dull.

Decorative powder formulations additionally comprise a very wide variety of coloured pigments. The choice of dyes is made primarily with the aim of achieving a currently fashionable hue.

The powder formulation may therefore comprise further constituents known to the person skilled in the art besides the constituents according to the invention.

In an advantageous embodiment, the powder product comprises at least one of the following pulverulent components: fillers, pigments, mother of pearl or mixtures thereof.

If necessary, fillers may be added to the preparation. Fillers have a positive influence on the texture and are able to modify the product properties with respect to fineness, uniformity, feel, durability and sebum resistance. In addition, fillers may facilitate visual effects in the end product.

Fillers which can be employed are inorganic substances, preferably talc, kaolin, boron nitride, silicates, in particular zeolites or phyllosilicates (mica). In the case of the phyllosilicates, the use of muscovite, phlogopite, biotite, sericite, lepidolite, paragonite, synthetic phyllosilicates or mixtures thereof are preferred. In addition, zinc oxide, titanium oxide, zirconium oxide, cerium oxide, magnesium carbonate and calcium carbonate, apatite(CaOH), glass or ceramic microcapsules can be employed.

Synthetic organic polymers which can be used are preferably polycarbonates, polyethers, polyesters, polyethylenes, polypropylene, polyvinyl chloride, polystyrenes, polyamides, polyurethanes, polyacrylates, poly-β-alanine powder or lauryllysine. Further preferred organic fillers can be selected from polytetrafluoroethylene, polymethyl methacrylates, silicone resins or silicone elastomers, celluloses, starches or starch derivatives.

In the case of coloured products, a multiplicity of different dyes, coloured pigments, pearlescent pigments or effect pigments can be employed. The person skilled in the art is in a position to select the suitable dyes or pigments for the respective application. These may be either in individual form or also in the form of a mixture and may be mutually coated with one another in order to achieve diverse colour effects. The particles may have various shapes, such as, for example, spherical, oval, flake-form or irregularly shaped, and in any desired combinations of the various shapes.

Colour pigments can be selected from white or coloured pigments, inorganic or organic pigments, and coated or uncoated pigments. Amongst inorganic pigments, preference is given to the use of titanium dioxide, optionally also coated, zirconium oxide, zinc oxide, cerium oxide, iron oxide (for example $Fe_2O_3$, $Fe_3O_4$, FeO(OH)), natural aluminium silicates, such as ochre, mica and kaolin, manganese-containing clays, such as umber and red bole, Manganese Violet, ultramarine, Chromium Oxide Green, Chromium Oxide Hydrate Green, chromium hydroxide and Berlin Blue. Organic pigments which can be employed are carbon black, FD&C Red 40, FD&C Yellow 5, FD&C Blue 1, D&C Green 5, carmine lakes (from cochineal) and lakes of organic dyes with aluminium, barium, calcium, strontium, zirconium or mixtures of the said substances.

In order to achieve particular colour effects, various natural pearlescent pigments, such as, for example, "fish silver" (guanine/hypoxanthine mixed crystals from fish scales) or "mother of pearl" (ground mussel shells), can additionally be employed. Pearlescent pigments can furthermore be selected from the white pearlescent pigments, such as, for example, mica coated with titanium dioxide or with bismuth chloride oxide (BiOCl). In addition, it is possible to employ coloured pearlescent pigments, such as titanium dioxide/mica pigments with iron oxides, titanium dioxide/mica pigments, in particular with Berlin Blue or chromium oxide, and titanium dioxide/mica pigments with various organic pigments, as well as monocrystalline pearlescent pigments, such as, for example, bismuth chloride oxide. Furthermore, it is also possible to use flake-form metal powders comprising aluminium, bronze, brass, copper, silver or gold. These lists are only illustrative and in no way definitive.

Pulverulent components which can be employed in the powder product are both hydrophobic and also hydrophilic pulverulent components or mixtures thereof. The hydrophobic pulverulent component can be at least one of the following:

talc, hydrophobic polymer powders, preferably polyamides, particularly preferably nylon 6.6, polyethylene powder, polyfluorine powder, preferably tetrafluoroethylene polymer, silicone powder or polystyrene powder. In addition, suitable hydrophobic pulverulent components are lipoamino acids, such as, for example, lauryllysine and boron nitrides.

Hydrophobic pulverulent components can likewise be selected from hydrophobic or hydrophilic pulverulent components which have been hydrophobically coated or treated. The hydrophobically coated pulverulent components may preferably have been coated with a silicone. Pulverulent components may likewise be coated with lecithins or vegetable waxes, such as carnauba wax. Likewise possible is the use of amino acids, fluorine derivatives, mineral oils, polyethylene, polyacrylates and/or mixtures thereof. In the case of hydrophobically coated and/or treated constituents, the use of the following pulverulent components is preferred: hydrophobically coated and/or treated mica, silicates, kaolin, metal oxides, preferably titanium dioxide, iron oxides, zinc oxides and/or mixtures thereof.

In a further advantageous embodiment, the hydrophilic pulverulent component in the cosmetic powder product is at least one of the following: hydrophilic mica, preferably phlogopites, bismuth chloride oxide, silicates, hydrophilic polymers, preferably polyacrylates, polyamides or polyurethanes, cellulose or starch derivatives, kaolin, apatite-(CaOH), zinc oxide, titanium oxide, calcium carbonate, magnesium carbonate, and/or mixtures thereof.

Pulverulent components may additionally be rendered hydrophilic by means of various materials. Of the hydrophilically coated and/or treated pulverulent components, the use of the following is preferred: hydrophilically coated and/or treated polyamide powder, talc, polyethylene powder, expanded vinylidene chloride-acetonitrile-methyl (meth) acrylate copolymers, polyfluoro powder, silicone powder, polyacrylate powder, polystyrene powder, pigments and mixtures thereof, hydrophilic organic or inorganic pigments.

In a preferred embodiment, the powder formulation furthermore comprises one or more ingredients selected from cereal starch, rice starch, maize starch, modified starch (for example aluminium starch octenylsuccinate), mica, synthetic mica, boron nitride, titanium dioxide, talc, aluminium oxide, bismuth oxychloride, PMMA, nylon, and silica. These ingredients may further optimise the easy and homogeneous distributability of the powder formulation according to the invention.

Besides the insect repellent and the magnesium hydroxide carbonate, a typical powder formulation comprises, for example, 30 to 80% by weight of talc, 1 to 15% by weight of starch or mica and 1 to 5% by weight of magnesium sulfate.

In a further advantageous embodiment, the powder formulation may additionally have at least one oil component. The oil component is employed here as binder. The binder system consists of constituents, usually liquid, which wet the pulverulent components and thus give the powder product compactness and a certain coherence. Binders additionally have a major influence on the texture feel. The oil component is preferably one of the following substances or the oil component comprises one or more of the following substances:

poly(organo)siloxanes (silicones), preferably methylcyclopolysiloxane, diethylpolysiloxane, methylphenylpolysiloxane, polysiloxane modified with fatty acids, polysiloxane modified with amino groups, particularly preferably methylpolysiloxane and/or dimethylpolysiloxane, ester oils, preferably isopropyl myristate, isopropyl palmitate, isopropyl stearate, isopropyl oleate, n-butyl stearate, n-hexyl laurate, n-decyl oleate, isooctyl stearate, isononyl stearate, isononyl isononanoate, 2-ethylhexyl palmitate, 2-ethylhexyl laurate, 2-hexyldecyl stearate, 2-octyldodecyl palmitate, oleyl oleate, oleyl erucate, erucyl oleate, erucyl erucate and synthetic, semisynthetic and natural mixtures of such esters, such as corn oil, avocado oil, camellia oil, olive oil, wheatgerm oil, apricot kernel oil, soya oil, peanut oil, cocoa butter and/or castor oil, waxes, preferably animal waxes, vegetable waxes mineral waxes and/or synthetic waxes.

In a further embodiment, the powder formulation according to the invention may additionally comprise one or more of the following assistants: trace elements, calming substances, surface-active substances, moistureretaining substances, refatting agents, fats, alcohols, polyols and toxicologically tolerated ethers and esters thereof, branched and/or unbranched hydrocarbons, antioxidants, vitamins, emulsifiers, stabilisers, pH regulators, bactericides, antimicrobial substances, masking agents, perfumes, silicones, ceramides, plant extracts, plasticisers, cohesion agents, foam stabilisers, thickeners, UV filters, preservatives, anti-ageing, anti-wrinkle, antidandruff, anti-acne, anti-cellulite active compounds, deodorants, skin-lightening active compounds or self-tanning substances.

The protective action of preparations against oxidative stress or against the action of free radicals can be improved if the preparations comprise one or more antioxidants, where the person skilled in the art is presented with absolutely no difficulties in selecting antioxidants which act suitably quickly or with a time delay. Favourable antioxidants, which, however, should nevertheless be used optionally, can be all antioxidants which are suitable or customary for cosmetic and/or dermatological applications.

The antioxidants are particularly advantageously selected from the group consisting of amino acids (for example glycine, histidine, tyrosine, tryptophan) and derivatives thereof, imidazoles, (for example urocanic acid) and derivatives thereof, peptides, such as D,L-carnosine, D-carnosine, L-carnosine and derivatives thereof (for example anserine), carotenoids, carotenes (for example alpha-carotene, beta-carotene, lycopene) and derivatives thereof, chlorogenic acid and derivatives thereof, lipoic acid and derivatives thereof (for example dihydrolipoic acid), aurothioglucose, propylthiouracil and other thiols (for example thioredoxin, glutathione, cysteine, cystine, cystamine and the glycosyl, N-acetyl, methyl, ethyl, propyl, amyl, butyl and lauryl, palmitoyl, oleyl, gamma-linoleyl, cholesteryl and glyceryl esters thereof) and salts thereof, dilauryl thiodipropionate, distearyl thiodipropionate, thiodipropionic acid and derivatives thereof (esters, ethers, peptides, lipids, nucleotides, nucleosides and salts), and sulfoximine compounds (for example buthionine sulfoximines, homocysteine sulfoximine, buthionine sulfones, penta-, hexa- and heptathionine sulfoximine) in very low tolerated doses (for example pmol to µmol/kg), and also (metal) chelating agents, (for example alpha-hydroxy fatty acids, palmitic acid, phytic acid, lactoferrin), alpha-hydroxy acids (for example citric acid, lactic acid, malic acid), humic acid, bile acid, bile extracts, bilirubin, biliverdin, EDTA, EGTA, pentasodium ethylenediamine tetramethylene phosphonate and derivatives thereof, unsaturated fatty acids and derivatives thereof, (for example gamma-linolenic acid, linoleic acid, oleic acid), folic acid and derivatives thereof, ubiquinone and ubiquinol and derivatives thereof, vitamin C and derivatives (for example ascorbyl palmitate, Mg ascorbyl phosphate, ascorbyl acetate), tocopherols and derivatives (for example vitamin E acetate), vitamin A and derivatives (vitamin A palmitate), and coniferyl benzoate of benzoin resin, rutinic acid and derivatives thereof, alpha-glycosylrutin, ferulic acid, furfurylideneglucitol, carnosine, butylhydroxytoluene, butylhydroxyanisole, nordihydroguaiacic resin acid, nordihydroguaiaretic acid, trihydroxybutyrophenone, quercetin, uric acid and derivatives thereof, mannose and derivatives thereof, zinc and derivatives thereof (for example ZnO, $ZnSO_4$), selenium and derivatives thereof (for example selenomethionine), stilbenes and derivatives thereof (for example stilbene oxide, trans-stilbene oxide).

Suitable antioxidants are also compounds of the formulae A or B

A in which
R¹ can be selected from the group —C(O)CH₃, —CO₂R³, —C(O)NH₂ and —C(O)N(R⁴)₂,
X denotes O or NH,
R² denotes linear or branched alkyl having 1 to 30 C atoms,
R³ denotes linear or branched alkyl having 1 to 20 C atoms,
R⁴ in each case, independently of one another, denotes H or linear or branched alkyl having 1 to 8 C atoms,
R⁵ denotes H, linear or branched alkyl having 1 to 8 C atoms or linear or branched alkoxy having 1 to 8 C atoms, and
R⁶ denotes linear or branched alkyl having 1 to 8 C atoms, preferably derivatives of 2-(4-hydroxy-3,5-dimethoxybenzylidene)malonic acid and/or 2-(4-hydroxy-3,5-dimethoxybenzyl)malonic acid, particularly preferably bis(2-ethylhexyl) 2-(4-hydroxy-3,5-dimethoxybenzylidene)malonate (for example Oxynex® ST Liquid) and/or bis(2-ethylhexyl) 2-(4-hydroxy-3,5-dimethoxybenzy)malonate (for example RonaCare® AP).

Mixtures of antioxidants are likewise suitable for use in the cosmetic preparations according to the invention. Known and commercial mixtures are, for example, mixtures comprising, as active ingredients, lecithin, L-(+)-ascorbyl palmitate and citric acid, natural tocopherols, L-(+)-ascorbyl palmitate, L-(+)-ascorbic acid and citric acid (for example Oxynex® K LIQUID), tocopherol extracts from natural sources, L-(+)-ascorbyl palmitate, L-(+)-ascorbic acid and citric acid (for example Oxynex® L LIQUID), DL-α-tocopherol, L-(+)-ascorbyl palmitate, citric acid and lecithin (for example Oxynex® LM) or butylhydroxytoluene (BHT), L-(+)-ascorbyl palmitate and citric acid (for example Oxynex® 2004). Antioxidants of this type are usually employed in such compositions with compounds according to the invention in percent by weight ratios in the range from 1000:1 to 1:1000, preferably in percent by weight ratios of 100:1 to 1:100.

Of the phenols which can be employed in accordance with the invention, the polyphenols, some of which are naturally occurring, are of particular interest for applications in the pharmaceutical, cosmetic or nutrition sector. For example, the flavonoids or bioflavonoids, which are principally known as plant dyes, frequently have an antioxidant potential. K. Lemanska, H. Szymusiak, B. Tyrakowska, R. Zielinski, I.M.C.M. Rietjens; Current Topics in Biophysics 2000, 24(2), 101-108, are concerned with effects of the substitution pattern of mono- and dihydroxyflavones. It is observed therein that dihydroxyflavones containing an OH group adjacent to the keto function or OH groups in the 3'4'- or 6,7- or 7,8-position have antioxidative properties, while other mono- and dihydroxyflavones in some cases do not have antioxidative properties.

Quercetin (cyanidanol, cyanidenolon 1522, meletin, sophoretin, ericin, 3,3',4',5,7-pentahydroxyflavone) is frequently mentioned as a particularly effective antioxidant (for example C. A. Rice-Evans, N. J. Miller, G. Paganga, Trends in Plant Science 1997, 2(4), 152-159). K. Lemanska, H. Szymusiak, B. Tyrakowska, R. Zielinski, A.E.M.F. Soffers and I.M.C.M. Rietjens (Free Radical Biology & Medicine 2001, 31(7), 869-881 investigate the pH dependence of the antioxidant action of hydroxyflavones. Quercetin exhibits the highest activity amongst the structures investigated over the entire pH range.

The amount of the above-mentioned antioxidants (one or more compounds) in the preparations according to the invention is preferably 0.001 to 30% by weight, particularly preferably 0.05 to 20% by weight, in particular 0.1 to 10% by weight, based on the total weight of the preparation.

The preparations may comprise vitamins as further ingredients. Preference is given to vitamins and vitamin derivatives selected from vitamin A, vitamin A propionate, vitamin A palmitate, vitamin A acetate, retinol, vitamin B, thiamine chloride hydrochloride (vitamin B₁), riboflavin (vitamin B₂), nicotinamide, vitamin C (ascorbic acid), vitamin D, ergocalciferol (vitamin D₂), vitamin E, DL-α-tocopherol, tocopherol E acetate, tocopherol hydrogensuccinate, vitamin K₁, esculin (vitamin P active compound), thiamine (vitamin B₁), nicotinic acid (niacin), pyridoxine, pyridoxal, pyridoxamine, (vitamin B₆), pantothenic acid, biotin, folic acid and cobalamine (vitamin B₁₂), particularly preferably vitamin A palmitate, vitamin C and derivatives thereof, DL-α-tocopherol, tocopherol E acetate, nicotinic acid, pantothenic acid and biotin. Vitamins are added with the usually in the case of cosmetic use in ranges from 0.01 to 5.0% by weight, based on the total weight.

The above-mentioned formulations can advantageously be combined with all known preservatives or antimicrobial active compounds, such as, for example, anisic acid, alcohol, ammomium benzoate, ammonium propionate, benzoic acid, bronopol, butylparaben, benzethonium chloride, benzalkonium chloride, 5-bromo-5-nitro-1,3-dioxane, benzyl alcohol, boric acid, benzisothiazolinone, benzotriazole, benzyl hemiformate, benzylparaben, 2-bromo-2-nitropropane-1,3-diol, butyl benzoate, chlorphenesin, capryl/capric glycerides, caprylyl glycol, *Camellia Sinensis* leaf extract, *Candida Bombicola*/glucose/methyl rapeseedates, chloroxylenol, chloroacetamide, chlorhexidine, chlorobutanol, calcium benzoate, calcium paraben, calcium propionate, calcium salicylate, calcium sorbate, captan, chloramine T, chlorhexidine diacetate, chlorhexidine digluconate, chlorhexidine dithydrochloride, chloroacetamine, p-chloro-m-cresol, chlorphen, p-chlorophenol, chlorothymol, *Citrus Grandis* (grapefruit) fruit extract, *Citrus Grandis* (grapefruit) seed extract, m-cresol, o-cresol, p-cresol, mixed cresols, 1,2-decanediol (INCI Decylene Glycol), diazolidinylurea, dichlorobenzyl alcohol, dimethyloxazolidine, DMDM hydantoin, dimethylhydroxmethylpyrazole, dehydroacetic acid, diazolidinylurea, DEDM hydantoin, DEDM hydantoin dilaurate, dibromopropamidine diisothionate, dimethylolethylenethiourea, dithiomethylbenzamide, DMHF, domiphen bromide, 7-ethylbicyclooxazolidine, ethylparaben, ethylhexylglycerin, ethanol, ethyl ferulate, formaldehyde, ferulic acid, glyceryl caprate, glutaral, glycerin formate, glyoxal, hexamidine diisethionate, hexanediol, hexetidine, hexamidine, hexamidineparaben, hexamidineparaben, 4-hydroxybenzoic acid, hydroxymethyldioxazabicyclooctane, imidazolidinylurea, imidiazolidinylurea NF, isobutylparaben, isothiazolinone, iodopropynylbutyl carbamate, isodecylparaben, isopropylcresol, isopropylparaben, isopropyl sorbate, potassium sorbate NF FCC, copper usnate, potassium benzoate, potassium ethylparaben, potassium methylparaben, potassium paraben, potassium phenoxide, potassium o-phenylphenate, potassium propionate, potassium propylparaben, potassium salicylate, potassium sorbate, methylparaben, methylisothiazolinone, methylbenzethonium chloride phenol, methyldibromoglutaronitrile, methenammonium chloride, methylbromoglutaronitrile, magnesium benzoate, magnesium propionate, magnesium salicylate, MDM hydantoin, MEA benzoate, MEA o-phenylphenate, MEA salicylate, methylchloristhiazolinone, sodium benzoate NF FCC, sodium caprylate, sodium dehydroacetate, sodium dehydroacetates FCC, sodium hydroxymethylglycinate, sodium methylparaben, sodium propylparaben, sodium iodoate, neem tree seed oil, nisin, sodium benzoate, sodium butylparaben, sodium p-chloro-m-cresol, sodium ethylparaben, sodium formate, sodium hydroxymethanesulfonate, sodium isobutylparaben, sodium paraben, sodium phenolsulfonate, sodium phenoxide, sodium o-phenylphenate, sodium propionate, sodium propylparaben, sodium pyrithione, sodium salicylate, sodium sorbate, ortholphenylphenol, phenoxyethanol, propylparaben, polymethoxybicyclicoxazolidine, *Pinus Pinaster* bark extract, poloxamer 188, PVP iodine, parabens, pircotone olamines, phenethyl alcohol, polyaminopropylbiguanide, polyquarternium-42, PEG-5 DEDM hydantoin, PEG-15 DEDM hydantoin, PEG-5 hydantoin oleate, PEG-15 DEDM hydantoin stearate, phenethyl alcohol, phenol, phenoxyethylparaben, phenoxyisopropanol, phenyl benzoate, phenyl mercury acetate, phenyl mercury benzoate, phenyl mercury borate, phenyl mercury bromide, phenyl mercury chloride, phenylparaben, o-phenylphenol, polyaminopropylbiguanide stearate, propionic acid, propyl benzoate, quaternium-15, quaternium-8, quaternium-14, *Rosmarinus officinalis* leaf extract, sorbic acid NF FCC, selenium disulfine, sorbic acid, salicylic acid, silver borosilicate, silver magnesium aluminium phosphate, triclosan, dialpha-tocopherol, tocopherol acetate, thimersal, triclocarban, TEA sorbate, thimerosal, usnic acid, undecylenoyl PEG-5 paraben, *Vitis vinifera* seed extract, tea tree oil, hydrogen peroxide, zinc pyrithione, zinc oxide, zinc phenolsulfonate or combinations thereof.

The preparations may also comprise one or more anti-ageing active compounds. Suitable anti-ageing active compounds, particular for skin-care preparations, are preferably so-called compatible solutes. These are substances which are involved in the osmoregulation of plants or microorganisms and can be isolated from these organisms. The generic term compatible solutes here also encompasses the osmolytes described in German patent application DE-A-10133202. Suitable osmolytes are, for example, the polyols, methylamine compounds and amino acids and respective precursors thereof. Osmolytes in the sense of German patent application DE-A-10133202 are taken to mean, in particular, substances from the group of the polyols, such as, for example, myo-inositol, mannitol or sorbitol, and/or one or more of the osmolytically active substances mentioned below: taurine, choline, betaine, phosphorylcholine, glycerophosphorylcholines, glutamine, glycine, α-alanine, glutamate, aspartate, proline, and taurine. Precursors of these substances are, for example, glucose, glucose polymers, phosphatidylcholine, phosphatidylinositol, inorganic phosphates, proteins, peptides and polyamino acids. Precursors are, for example, compounds which are converted into osmolytes by metabolic steps.

Compatible solutes which are preferably employed in accordance with the invention are substances selected from the group consisting of pyrimidinecarboxylic acids (such as ectoin and hydroxyectoin), proline, betaine, glutamine, cyclic diphosphoglycerate, N-acetylornithine, trimethylamine Noxide, di-myo-inositol phosphate (DIP), cyclic 2,3-diphosphoglycerate (cDPG), 1,1-diglycerin phosphate (DGP), β-mannosyl glycerate (firoin), β-mannosyl glyceramide (firoin-A) or/and dimannosyl diinositol phosphate (DMIP) or an optical isomer, derivative, for example an acid, a salt or ester, of these compounds, or combinations thereof.

Of the pyrimidinecarboxylic acids, particular mention should be made here of ectoin ((S)-1,4,5,6-tetrahydro-2-methyl-4-pyrimidinecarboxylic acid) and hydroxyectoin ((S,S)-1,4,5,6-tetrahydro-5-hydroxy-2-methyl-4-pyrimidinecarboxylic acid) and derivatives thereof.

Additionally, anti-ageing active compounds which can be used are products from Merck, such as, for example, 5,7-dihydroxy-2-methylchromone, marketed under the trade name RonaCare®Luremine, Ronacare®Isoquercetin, Ronacare®Tilirosid or Ronacare®Cyclopeptide 5.

The preparations may also comprise one or more skin-lightening active compounds or synonymously depigmentation active compounds or melanogenesis inhibitors. Skin-lightening active compounds can in principle be all active compounds known to the person skilled in the art. Examples of compounds having skin-lightening activity are hydroquinone, kojic acid, arbutin, aloesin, niacinamide, azelaic acid, elagic acid, mulberry extract, magnesium ascorbyl phosphate, liquorice extract, emblica, ascorbic acid or rucinol.

Furthermore, the preparations according to the invention may comprise at least one self-tanning substance as further ingredient.

Advantageous self-tanning substances which can be employed are, inter alia:

1,3-dihydroxyacetone, glycerolaldehyde, hydroxymethylglyoxal, γ-dialdehyde, erythrulose, 6-aldo-D-fructose, ninhydrin, 5-hydroxy-1,4-naphtoquinone (juglone) or 2-hydroxy-1,4-naphtoquinone (lawsone). Very particular preference is given to 1,3-dihydroxyacetone, erythrulose or combination thereof.

The at least one further self-tanning substance is preferably present in the preparation in an amount of 0.01 to 20% by weight, particularly preferably in an amount of 0.5 to 15% by weight and very particularly preferably in an amount of 1 to 8% by weight, based on the total amount of the preparation.

Refatting substances can be selected, for example, from purcellin oil, Eucerit TM and Neoceht TM.

Preparations which comprise a UV filter are also favourable. This can be a UV-A filter substance and/or a UV-B filter substance. Formulations of this type may optionally also comprise one or more inorganic pigments as UV filter substances.

The preparations according to the invention may additionally comprise at least one UV filter.

Organic UV filters, so-called hydrophilic or lipophilic sun-protection filters, are effective in the UVA region and/or UVB region and/or IR and/or VIS region (absorbers). These substances can be selected, in particular, from cinnamic acid derivatives, salicylic acid derivatives, camphor derivatives, triazine derivatives, β,β-diphenylacrylate derivatives, p-aminobenzoic acid derivtives and polymeric filters and silicone filters, which are described in the application WO 93/04665. Further examples of organic filters are indicated in the patent application EP-A 0 487 404. The said UV filters are usually named below in accordance with INCI nomenclature.

Particularly suitable for a combination are:
para-Aminobenzoic acid and derivatives thereof: PABA, Ethyl PABA, Ethyl dihydroxypropyl PABA, Ethylhexyl dimethyl PABA, for example marketed by ISP under the name "Escalol 507", Glyceryl PABA, PEG-25 PABA, for example marketed by BASF under the name "Uvinul P25".

Salicylates: Homosalate marketed by Merck under the name "Eusolex HMS"; Ethylhexyl salicylate, for example marketed by Symrise under the name "Neo Heliopan OS"; Dipropylene glycol salicylate, for example marketed by Scher under the name "Dipsal"; TEA salicylate, for example marketed by Symrise under the name "Neo Heliopan TS".

β,β-Diphenylacrylate derivatives: Octocrylene, for example marketed by Merck under the name "Eusolex® OCR"; "Uvinul N539" from BASF; Etocrylene, for example marketed by BASF under the name "Uvinul N35".

Benzophenone derivatives: Benzophenone-1, for example marketed under the name "Uvinul 400"; Benzophenone-2, for example marketed under the name "Uvinul D50"; Benzophenone-3 or oxybenzone, for example marketed under the name "Uvinul M40"; Benzophenone-4, for example marketed under the name "Uvinul MS40"; Benzophenone-9, for example marketed by BASF under the name "Uvinul DS-49"; Benzophenone-5, Benzophenone-6, for example marketed by Norquay under the name "Helisorb 11"; Benzophenone-8, for example marketed by American Cyanamid under the name "Spectra-Sorb UV-24"; Benzophenone-12 n-hexyl 2-(4-diethylamino-2-hydroxybenzoyl) benzoate or 2-hydroxy-4-methoxybenzophenone, marketed by Merck, Darmstadt, under the name Eusolex® 4360.

Benzylidenecamphor derivatives: 3-Benzylidenecamphor, for example marketed by Chimex under the name "Mexoryl SD"; 4-Methylbenzylidenecamphor, for example marketed by Merck under the name "Eusolex 6300"; Benzylidenecamphorsulfonic acid, for example marketed by Chimex under the name "Mexoryl SL"; Camphor benzalkonium methosulfate, for example marketed by Chimex under the name "Mexoryl SO"; terephthalylidenedicamphorsulfonic acid, for example marketed by Chimex under the name "Mexoryl SX"; Polyacrylamidomethylbenzylidenecamphor marketed by Chimex under the name "Mexoryl SW".

Phenylbenzimidazole derivatives: Phenylbenzimidazolesulfonic acid, for example marketed by Merck under the name "Eusolex 232"; disodium phenyl dibenzimidazole tetrasulfonate, for example marketed by Symrise under the name "Neo Heliopan AP".

Phenylbenzotriazole derivatives: Drometrizole trisiloxane, for example marketed by Rhodia Chimie under the name "Silatrizole"; Methylenebis(benzotriazolyl)tetramethylbutylphenol in solid form, for example marketed by Fairmount Chemical under the name "MIXXIM BB/100", or in micronised form as an aqueous dispersion, for example marketed by BASF under the name "Tinosorb M".

Triazine derivatives: Ethylhexyltriazone, for example marketed by BASF under the name "Uvinul T150"; Diethylhexylbutamidotriazone, for example marketed by Sigma 3V under the name "Uvasorb HEB". Further triazine derivatives are by way of example 2,4,6-tris(diisobutyl 4'-aminobenzalmalonate)-s-triazine, or 2,4,6-tris(biphenyl)-1,3,5-triazine, butyl 4-({4-{[4-(butoxycarbonyl)phenyl]amino}-6-[(3-{1,3,3,3-tetramethyl-1-[(trimethylsilyl)oxy]disiloxanyl}propyl)amino]-1,3,5-triazin-2-yl}amino)benzoate, marketed under the nameMexoryl SBS. Structure of Mexoryl SBS:

and bis-ethylhexyloxyphenol methoxyphenyl triazine, for example marketed by BASF under the name Tinosorb S.

Anthraniline derivatives: Menthyl anthranilate, for example marketed by Symrise under the name "Neo Heliopan MA".

Imidazole derivatives: ethylhexyldimethoxybenzylidenedioxoimidazoline propionate.

Benzalmalonate derivatives: polyorganosiloxanes containing functional benzalmalonate groups, such as, for example, Polysilicone-15, for example marketed by Hoffmann LaRoche under the name "Parsol SLX".

4,4-Diarylbutadiene derivatives: 1,1-Dicarboxy(2,2'-dimethylpropyl)-4,4-diphenylbutadiene.

Benzoxazole derivatives: 2,4-bis[5-(1-dimethylpropyl)benzoxazol-2-yl(4-phenyl) imino]-6-(2-ethylhexyl)imino-1,3,5-triazine, for example marketed by Sigma 3V under the name Uvasorb K2A, and mixtures comprising this.

Piperazine derivatives, such as, for example, the compound or the UV filters of the following structures It is also possible to use UV filters based on polysiloxane copolymers having a random distribution in accordance with the following formula, where, for example, a=1.2; b=58 and c=2.8:

The compounds listed should only be regarded as examples, Other UV filters can of course also be used.

Suitable organic UV-protecting substances can preferably be selected from the following list: Ethylhexyl salicylate, Phenylbenzimidazolesulfonic acid, Benzophenone-3, Benzophenone-4, Benzophenone-5, n-Hexyl 2-(4-diethylamino-2-hydroxybenzoyl)benzoate, 4-Methylbenzylidenecamphor, Terephthalylidenedicamphorsulfonic acid, Disodium phenyldibenzimidazoletetrasulfonate, Methylenebis(benzotriazolyl)tetramethylbutylphenol, Ethylhexyl Triazone, Diethylhexyl Butamido Triazone, Drometrizole trisiloxane, Polysilicone-15, 1,1-Dicarboxy(2,2'-dimethylpropyl)-4,4-diphenylbutadiene, 2,4-Bis[5-1 (dimethylpropyl)benzoxazol-2-yl(4-phenyl) imino]-6-(2-ethylhexyl)imino-1,3,5-triazine and mixtures thereof.

These organic UV filters are generally incorporated into formulations in an amount of 0.01 percent by weight to 20 percent by weight, preferably 1% by weight—10% by weight.

Besides the optional organic UV filters, as described above, the preparations may comprise further inorganic UV filters, so-called particulate UV filters.

These combinations with particulate UV filters are possible both as powder and also as dispersion or paste of the following types.

Preference is given here both to those from the group of the titanium dioxides, such as, for example, coated titanium dioxide (for example Eusolex® T-2000, Eusolex® T-AQUA, Eusolex® T-AVO, Eusolex® T-OLEO), zinc oxides (for example Sachtotec®), iron oxides or also cerium oxides and/or zirconium oxides.

Furthermore, combinations with pigmentary titanium dioxide or zinc oxide are also possible, where the particle size of these pigments are greater than or equal to 200 nm, for example Hombitan® FG or Hombitan® FF-Pharma.

It may furthermore be preferred for the preparations to comprise inorganic UV filters which have been aftertreated by conventional methods, as described, for example, in Cosmetics & Toiletries, February 1990, Vol. 105, pp. 53 64. One or more of the following aftertreatment components can be selected here: amino acids, beeswax, fatty acids, fatty acid alcohols, anionic surfactants, lecithin, phospholipids, sodium, potassium, zinc, iron or aluminium salts of fatty acids, polyethylenes, silicones, proteins (particularly collagen or elastin), alkanolamines, silicon dioxide, aluminium oxide, further metal oxides, phosphates, such as sodium hexametaphosphate, or glycerin.

Particulate UV filters which are preferably employed here are:
  untreated titanium dioxides, such as, for example, the products Microtitanium Dioxide MT 500 B from Tayca; titanium dioxide P25 from Evonik;
  Aftertreated micronised titanium dioxides with aluminium oxide and silicon dioxide aftertreatment, such as, for example, the product "Microtitanium Dioxide MT 100 SA from Tayca, or the product "Tioveil Fin" from Uniqema;—Aftertreated micronised titanium dioxides with aluminium oxide and/or aluminium stearate/laurate aftertreatment, such as, for example, Microtitanium Dioxide MT 100 T from Tayca; Eusolex T-2000 from Merck;
  Aftertreated micronised titanium dioxides with iron oxide and/or iron stearate aftertreatment, such as, for example, the product "Microtitanium Dioxide MT 100 F" from Tayca;
  Aftertreated micronised titanium dioxides with silicon dioxide, aluminium oxide and silicone aftertreatment, such as, for example, the product "Microtitanium Dioxide MT 100 SAS", from Tayca;
  Aftertreated micronised titanium dioxides with sodium hexameta¬ phosphate, such as, for example, the product "Microtitanium Dioxide MT 150 W" from Tayca,
  Aftertreated micronised titanium dioxides with aluminium oxide and manganese dioxide aftertreatment such as, for example, the product "Eusolex T-PRO" from Merck, The treated micronised titanium dioxides employed for the combination may also be aftertreated with:
  Octyltrimethoxysilanes, such as, for example, the product "Tego Sun T 805" from Degussa;—Silicon dioxide; such as, for example, the product Parsol "T-X" from DSM;
  Aluminium oxide and stearic acid; such as, for example, the product "UV-Titan M160" from Sachtleben;
  Aluminium and glycerin; such as, for example, the product "UV-Titan 212" from Sachtleben,
  Aluminium and silicone oils, such as, for example, the product "UV-Titan M262" from Sachtleben;
  Sodium hexamethaphosphate and polyvinylpyrrolidone,
  Polydimethylsiloxanes, such as, for example, the product "70250 Cardre UF TiO2SI3" from Cardre;

Polydimethylhydrogenosiloxanes, such as, for example, the product "Microtitanium Dioxide USP Grade Hydrophobic" from Color Techniques, Silicon dioxide and cetyl phosphate, such as, for example, the product Eusolex T-EASY from Merck.

Combination with the following products may furthermore also be advantageous:

Untreated zinc oxides, such as, for example, the product Z-Cote from BASF (Sunsmart), Nanox from Elementis;

Aftertreated zinc oxides, such as, for example, the following products:

"Zinc Oxide CS-5" from Toshibi (ZnO aftertreated with polymethyl-hydrogenosiloxane);

Nanogard Zinc Oxide FN from Nanophase Technologies;

"SPD-Z1" from Shin-Etsu (ZnO aftertreated with a silicone-grafted acrylic polymer, dispersed in cyclodimethylsiloxanes);

"Escalol Z100" from ISP (aluminium oxide-aftertreated ZnO, dispersed in an ethylhexyl methoxycinnamate/PVP-hexadecene/methicone copolymer mixture);

"Fuji ZNO-SMS-10" from Fuji Pigment (ZnO aftertreated with silicon dioxide and polymethylsilesquioxane);

Untreated cerium oxide micropigment, for example with the name "Colloidal Cerium Oxide" from Rhone Poulenc;

Untreated and/or aftertreated iron oxides with the name Nanogar from Arnaud.

By way of example, it is also possible to employ mixtures of various metal oxides, such as, for example, titanium dioxide and cerium oxide, with and without aftertreatment, such as, for example, the product Sunveil A from Ikeda. In addition, mixtures of aluminium oxide-, silicon dioxide- and silicone-aftertreated titanium dioxide/zinc oxide mixtures, such as, for example, the product UV-Titan M261 from Sachtleben, can also be used.

These inorganic UV filters are generally incorporated into the preparations in an amount of 0.1 percent by weight to 25 percent by weight, preferably 2% by weight—10% by weight.

By combination of one or more of the said compounds having a UV filter action, the protective action against harmful effects of the UV radiation can be optimised.

All said UV filters can also be employed in encapsulated form. In particular, it is advantageous to employ organic UV filters in encapsulated form.

The capsules in preparations to be employed in accordance with the invention are preferably present in amounts which ensure that the encapsulated UV filters are present in the preparation in the percent by weight ratios indicated above.

The person skilled in the art is presented with absolutely no difficulties in selecting suitable additional ingredients for the respective application of the powder according to the invention and determining the suitable amount.

The powder formulation according to the invention can be both a pressed powder product and also a loose powder product. The formulation may also be in the form of a powder aerosol.

The present invention also relates to a process for the preparation of a powder formulation as described above, characterised in that the at least one insect repellent is mixed with the magnesium hydroxide carbonate and any further ingredients, as described above.

The said constituents of preparation can be incorporated in the usual manner, with the aid techniques which are well known to the person skilled in the art.

Typically, firstly the individual powder components are stirred with one another using suitable mixing tools or powder mixing machines, until a homogeneous mixture forms. Suitable for this purpose is, for example, a stirring machine with propeller stirrer or a mill, for example a knife mill, rotor mill, ball mill or mortar mill, or countercurrent mixing units or rotary jet mixers. The insect repellent is subsequently added, and stirring is continued until it has been homogeneously distributed in the mixture.

The present invention furthermore also relates to the use of a powder formulation as described above for repelling insects.

For use, the powder formulations according to the invention are applied to the skin or hair in sufficient amount in the usual manner for topical products.

The following examples are intended to illustrate the present invention:

EXAMPLES

Example 1: Preparation of the Powder

The individual components of the powder (see Table 2, Table 3 and Table 4) are mixed twice at 8000 rpm for 15 sec. with the aid of a Retsch GM 200 knife mill. The container with the powder is emptied onto a paper between each mixing operation and returned to the mixing container. The insect repellent is added dropwise to the mixing container; mixing is repeated a further three times at 8000 rpm for 15 sec. in each case.

TABLE 1

| | Materials and sources of supply: | | |
|---|---|---|---|
| Name | INCI | Article Number | Source of supply |
| IR3535 ® (ethyl 3-(N-butylacetamino)-propionate) | ETHYLBUTYLACETOYL-AMINOPROPIONATE | 111887 | Merck KGaA |

TABLE 1-continued

Materials and sources of supply:

| Name | INCI | Article Number | Source of supply |
|---|---|---|---|
| Parteck ® LUB Talc | TALC | 108070 | Merck KGaA |
| Maisita Natural | ZEA MAYS (CORN) STARCH | 9083 | Agrana |
| Covabead PMMA | POLYMETHYL METHACRYLAT | | Sensient |
| Magnesium hydroxyde carbonate heavy (bulk density >400 g/l) | MAGNESIUM CARBONATE | 105829 | Merck Millipore |
| PharMagnesia MC Type E (bulk density about 120 g/l) | MAGNESIUM CARBONATE | 24202010-00 | Lehmann& Voss&Co |
| Reisita Natural | OROZA SATIVA STARCH | 9094 | Agrana Starke GmbH |
| Parteck ® LUB MST | MAGNESIUMSTEARATE | 100663 | Merck KGaA |
| Polyethylene Glycol 400 | PEG-8 | 817003 | Merck KGaA |
| Arlamol PS15E | PPG-15 STEARYL ETHER | | Croda GmbH |
| Ethanol 96% | ALCOHOL | 100971 | Merck KGaA |
| Polyethylene Glycol 1500 | PEG-32 | 817005 | Merck KGaA |
| Tween 20 | POLYSORBATE 20 | 817072 | Merck KGaA |
| RonaFlair ® Mica M | MICA | 104750 | Merck KGaA |
| Magnesia ® 12 | MAGNESIUM CARBONATE | 1120000 | Magnesia GmbH |
| RonaFlair ® Soft Sphere | SYNTHETIC FLURPHOLOPITE | 117756 | Merck KGaA |
| RonaFlair ® ESQ | BISMUTH OXYCHLORIDE | 117061 | Merck KGaA |
| RonaFlair ® Boroneige ® SF-15 | BORON NITRIDE | 117778 | Merck KGaA |
| RonaFlair ® White Sapphire | SYNTHETIC SAPPHIRE | 117751 | Merck KGaA |
| Orgasol ® 2002 D NAT COS | NYLON-12 | | Arkema |

Example 2: Evaluation of the Powder Distribution

Materials used:
MSE4202S-0CE-D0 precision balance from Sartorius AG
MSA324S-0CE-DU analytical balance from Sartorius AG
300 g/m² photocard from Ludwig Bähr GmbH &Co.KG (Art. No.: 3774690)

Figure 1A:
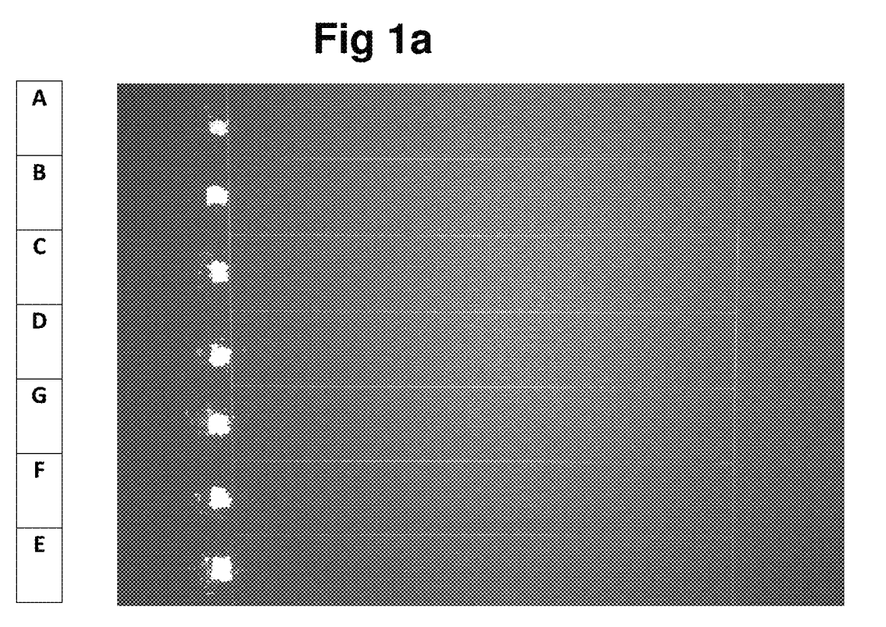
FIG. 1a shows the first step of the test for powder distribution in accordance with Example 2: The powder formulations to be tested are applied in small heaps to fine cardboard on a precision balance.

Procedure:

The fine cardboard is fixed to the precision balance using double-sided adhesive tape. 30.0±3 mg of powder are applied to the paper in the form of a small heap. The precise amount used is noted (FIG. 1a).

Figure 1B:
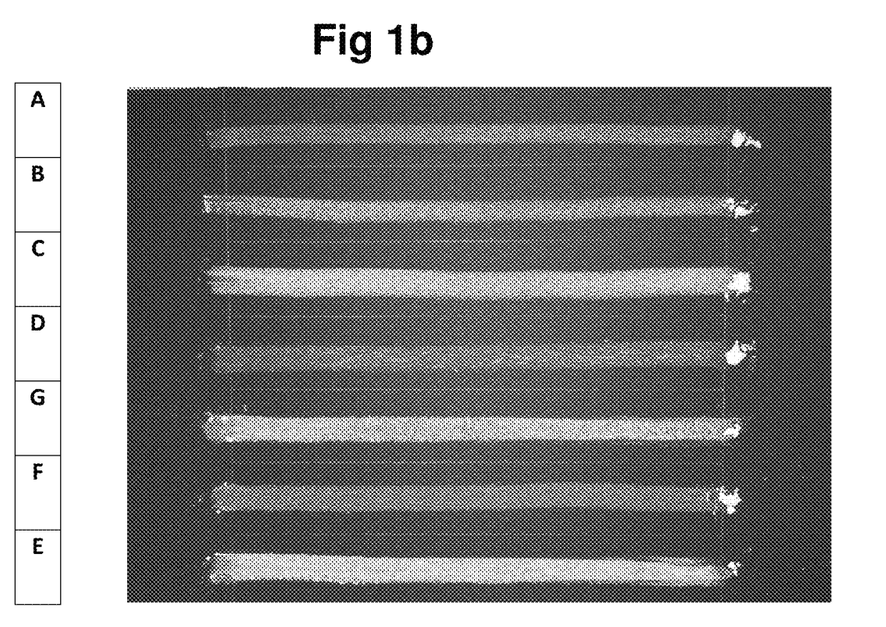
FIG. 1b shows the second step of the test for powder distribution in accordance with Example 2: The heaps were distributed over a distance of 20 cm using the finger under uniform pressure.

The index finger is pressed onto the powder heap with a weight of 200 to 250 g (the weight is checked on the precision balance) and moved uniformly over a distance of 20 cm. The result is shown in FIG. 1b. The amount of material that does not remain on the 20 cm distance is transferred quantitatively into a weighing boat and weighed. The amount is noted.

The process is repeated at least three times for each sample.

The quotient of the material remaining on the 20 cm to the material originally employed describes the distribution capacity of the powder and is expressed in % (abrason) (see Table 2 and Table 3). The higher the abrasion, the better the distribution of the formulation on the skin. Formulations having low abrasion cannot be distributed on the skin, since the particles of these formulations stick together.

Formulations A to G are tested. Formulations A, B and C represent classical powder formulations as comparative formulations (Table 2). Formulations according to the invention are formulations D, E, F and G (Table 3).

TABLE 2

Comparative formulations

| | Material | A | B | C |
|---|---|---|---|---|
| IR 3535 | ETHYLBUTYLACETOYLAMINOPROPIONATE | 20% | 20% | 20% |
| Parteck® LUB Talc | TALC | 80% | | |

TABLE 2-continued

| | | Comparative formulations | | |
|---|---|---|---|---|
| | Material | A | B | C |
| Maisita Natural | ZEA MAYS (CORN) STARCH | | 80% | |
| Covabea PMMA | POLYMETHYL METHACRYLAT | | | 80% |
| Sum | | 100.0% | 100.0% | 100% |
| Pay-off in % | | 23.5% | 52.7% | 45.8% |

Formulation A represents a standard formulation consisting principally of talc. It has low abrasion and cannot be distributed on the skin. Common substances which are employed in order to make the formulations powdery in order that they can be distributed better on the skin are, for example, starch or PMMA. Formulations B and C exhibit somewhat higher abrasion, but too low in order to allow good distribution on the skin.

TABLE 3

| Material | | D | E | F | G |
|---|---|---|---|---|---|
| Parteck® LUB Talc | TALC | 30.00 | 30.00 | 48.00 | 47.00 |
| Magnesium hydroxide carbonate heavy (bulk density >400 g/l) | MAGNESIUM CARBONATE | 28.00 | | | |
| PharMagnesia MC Type E (bulk density about 120 g/l) | MAGNESIUM CARBONATE | | 28.00 | 10.00 | 25.00 |
| Reisita Natural | OROZA SATIVA STARCH | 19.00 | 19.00 | 19.00 | 5.00 |
| Parteck® LUB MST | MAGNESIUMSTEARATE | 3.00 | 3.00 | 3.00 | 3.00 |
| IR 3535 | ETHYLBUTYLACETOYLAMINOPROPIONATE | 20.00 | 20.00 | 20.00 | 20.00 |
| Sum | | 100.00 | 100.00 | 100.00 | 100.0 |
| Abrasion in % | | 37.2% | 87.7% | 35.6% | 68.8% |

Surprisingly, the use of magnesium hydroxide carbonate in the formulations exhibits a significant increase in abrasion.

Example 3: In Vivo Efficacy Study for Determination of the Efficacy of the Powders Against Mosquitoes Procedure:
i. Suitability Test
  a) Mosquitoes: *Aedes albopictus*, females which have not been fed with blood, 3-5 days after hatching.
  b) Room temperature: 25° C.-26° C.
  c) Air humidity: 60%-65%
  d) Analytical balance: BP110S from Sartorius AG
  e) Stopwatch: SJ9-2 from Jinque At least 300 mosquitoes are located in a cage having the dimensions: length=400 mm, width=300 mm and height=300 mm. Test subjects wearing a test glove which leaves 16 cm² (4 cm×4 cm) of the skin on the back of the hand unprotected place their hand in the cage for 2 min. If more than 30 mosquitoes land on the exposed skin, the test subject and the mosquitoes are regarded as suitable for the test. 4 suitable test subjects (2 male and 2 female) are selected for the test.

ii. Powder Dose: 1.5 mg/cm²

A total amount of 37.5 mg of the powder is applied to an area of 25 cm² (5 cm×5 cm).

iii. Performance of the Test:

The test powder is in each case applied uniformly to the back of one hand hand (5 cm×5 cm) of each test subject in a dose of 1.5 mg/cm². The other hand serves as comparison. Two hours after application of the powder, the test subjects hold the arms in the cage while wearing the test glove, with the area to which the powder has been applied cut out.

It is observed for two minutes whether the mosquitoes land on the exposed areas and suck the blood.

This procedure is repeated every hour until a mosquito lands on the skin during the two minute observation time and sucks blood. The expression "in vivo efficacy" indicates how long protection against the mosquitoes exists for the respective formulations, i.e. how long it takes until the first mosquito lands on the skin and sucks blood. The value indicated is determined from the average of the determination of the protection time of the four subjects.

iv. Samples Tested:

Formulations E, G, H, I and J according to the invention are tested (see Table 4; the preparation is carried out in accordance with Example 1).

An insect repellent spray of the following recipe serves as a positive control:

| Ingredients | INCI | [%] |
|---|---|---|
| A | | |
| IR3535 ® | ETHYL BUTYLACETYLAMINOPROPIONATE | 20.00 |
| Polyethylene Glycol 400 | PEG-8 | 5.00 |
| Arlamol PS15E | PPG-15 STEARYL ETHER | 3.00 |
| B | | |
| Ethanol 96% | ALCOHOL | 35.00 |
| Polyethylene Glycol 1500 | PEG-32 | 4.00 |
| Tween 20 | POLYSORBATE 20 | 1.50 |
| Water | AQUA | 31.50 |

Phase A and B are mixed separately. Phase B is slowly added to phase A, and the mixture is stirred until a homogeneous and clear mixture forms (pH (21° C.)=6.70).

Result:

The result of the test is shown in Table 4. An in vivo efficacy of 4.5 hours is obtained for the positive control.

TABLE 4

| | Material | E | G | H | I | J |
|---|---|---|---|---|---|---|
| Parteck ® LUB Talc | TALC | 30.00 | 47.00 | 42.00 | 57.00 | 72.00 |
| PharMagnesia MC Type E | MAGNESIUM CARBONATE | 28.00 | 25.00 | 25.00 | 20.00 | 10.00 |
| Reisita Natural | OROZA SATIVA STARCH | 19.00 | 5.00 | | 5.00 | 5.00 |
| Parteck ® LUB MST | MAGNESIUM STEARATE | 3.00 | 3.00 | 3.00 | 3.00 | 3.00 |
| RonaFlair ® Mica M | MICA | | | | 10.00 | |
| IR 3535 | ETHYLBUTYL-ACETOYLAMINO-PROPIONATE | 20.00 | 20.00 | 20.00 | 15.00 | 10.00 |
| Sum | | 100.00 | 100.00 | 100.00 | 100.00 | 100.00 |
| In vivo efficacy | | 2.3 h | 3.8 h | 2.8 h | 3.5 h | 2.5 h |

Formulation G shows that a lower concentration of magnesium hydroxide carbonate and starch is able to extend the efficacy. Formulations I and J show the dependence of the concentration of IR 3535 and the efficacy duration.

Example 4: Formulation Examples

TABLE 5

| | Material | 1 | 2 | 3 | 4 | 5 | 6 | 7 |
|---|---|---|---|---|---|---|---|---|
| Parteck ® LUB Talc | TALC | 70.00 | 60.00 | 85.00 | 65.00 | 65.00 | 50.00 | 55.00 |
| PharMagnesia MC Type E | MAGNESIUM CARBONATE | 20.00 | 10.00 | | | | 20.00 | |
| Magnesia ® 12 | MAGNESIUM CARBONATE | | | 5.00 | 10.00 | 15.00 | | 15.00 |
| RonaFlair ® Soft Sphere | SYNTHETIC FLURPHOLOPITE | | 10.00 | | | | | |
| RonaFlair ® ESQ | BISMUTH OXYCHLORIDE | | | | | 5.00 | | |
| RonaFlair ® Boroneige ® SF-15 | BORON NITRIDE | | | | | | 10.00 | |
| RonaFlair ® White Sapphire | SYNTHETIC SAPPHIRE | | | | | | | 10.00 |
| Orgasol ® 2002 D NAT COS | NYLON-12 | | | | 5.00 | | | |
| IR 3535 | ETHYLBUTYL-ACETOYLAMINO-PROPIONATE | 10.00 | 20.00 | 10.00 | 20.00 | 15.00 | 20.00 | 20.00 |
| Sum | | 100.00 | 100.00 | 100.00 | 100.00 | 100.00 | 100.00 | 100.00 |

The invention claimed is:

1. A powder formulation comprising (a) at least one insect repellent selected from the group consisting of N,N-diethyl-m-toluamide, ethyl 3-(N-butylacetamino)propionate, 1-(1-methylpropoxycarbonyl)-2-(2-hydroxyethyl)piperidine, citronella oil and andiroba oil and (b) magnesium hydroxide carbonate, wherein the magnesium hydroxide carbonate has a bulk density of at most about 200 g/l, the weight ratio of magnesium hydroxide carbonate to insect repellent in the formulations is 2:1 to 1:1 and the formulation comprises 5 to 20% by weight of the at least one insect repellent, based on the total weight of the formulation.

2. The powder formulation according to claim 1, wherein the at least one insect repellent is ethyl 3-(N-butylacetamino)propionate.

3. A powder formulation comprising (a) at least one insect repellent selected from the group consisting of N,N-diethyl-m-toluamide, ethyl 3-(N-butylacetamino)propionate, 1-(1-methylpropoxycarbonyl)-2-(2-hydroxyethyl)piperidine, citronella oil and andiroba oil and (b) magnesium hydroxide carbonate, wherein the magnesium hydroxide carbonate has a bulk density of at most about 130 g/l.

4. The powder formulation according to claim 1, which comprises 5 to 10% by weight, based on total weight of formulation, of the at least one insect repellent.

5. The powder formulation according to claim 4, which comprises 10 to 20% by weight, based on the total weight of the formulation, of the at least one insect repellent.

6. The powder formulation according to claim 1, which comprises 5 to 40% by weight, based on the total weight of the formulation, of magnesium hydroxide carbonate.

7. The powder formulation according to claim 6, which comprises 5 to 30% by weight, based on the total weight of the formulation, of magnesium hydroxide carbonate.

8. The powder formulation according to claim 1, wherein the weight ratio of magnesium hydroxide carbonate to insect repellent in the formulation is 2:1 to 1.5:1.

9. The powder formulation according to claim 8, wherein the weight ratio of magnesium hydroxide carbonate to insect repellent in the formulation is 1.5:1 to 1:1.

10. The powder formulation according to claim 1, which furthermore comprises one or more ingredients selected from the group consisting of cereal starch, rice starch, maize starch, modified starch, mica, synthetic mica, boron nitride, titanium dioxide, talc, aluminium oxide, bismuth oxychloride, PMMA, nylon and silica.

11. A process for preparing the powder formulation according to claim 1, comprising mixing the at least one insect repellent with the magnesium hydroxide carbonate and any further ingredients.

12. A process for repelling insects, comprising repelling insects by applying to the skin of a host a powder formulation according to claim 1.

13. The powder formulation according to claim 1, wherein the at least one insect repellent is ethyl N,N-diethyl-m-toluamide.

14. The powder formulation according to claim 1, wherein the at least one insect repellent is 1-(1-methylpropoxycarbonyl)-2-(2-hydroxyethyl)piperidine.

15. The powder formulation according to claim 1, wherein the at least one insect repellent is citronella oil.

16. The powder formulation according to claim 1, wherein the at least one insect repellent is andiroba oil.

* * * * *